(12) United States Patent
Thornton (10) Patent No.: US 8,769,742 B2
(45) Date of Patent: Jul. 8, 2014

(54) DEVICE WITH ROLL MECHANISM (75) Inventor: Aaron Thornton, Santa Monica, CA (US)

(73) Assignee: ARHO Innovations, Hollywood, CA (US)

( * ) Notice: Subject to any disclaimer, the term of this patent is extended or adjusted under 35 U.S.C. 154(b) by 8 days.

(21) Appl. No.: 13/539,211

(22) Filed: Jun. 29, 2012

(65) Prior Publication Data

US 2014/0000984 A1  Jan. 2, 2014

(51) Int. Cl.
*A47G 9/06* (2006.01)

(52) U.S. Cl.
USPC .................................. 5/420; 5/417

(58) Field of Classification Search
USPC .............. 5/417, 419, 420, 656; 160/238, 313, 160/370.22
See application file for complete search history.

(56) References Cited

U.S. PATENT DOCUMENTS

| | | | | |
|---|---|---|---|---|
| 2,190,566 A * | 2/1940 | Julian | ............................... | 135/95 |
| 3,268,922 A * | 8/1966 | Moxley | .............................. | 5/420 |
| 4,951,333 A * | 8/1990 | Kaiser et al. | ....................... | 5/417 |
| 5,184,361 A * | 2/1993 | Canter et al. | .................. | 5/413 R |
| 5,267,599 A * | 12/1993 | Kim | ........................... | 160/370.21 |
| 5,845,804 A * | 12/1998 | Prescott | ......................... | 220/739 |
| 6,220,916 B1 | 4/2001 | Bart | | |
| 6,309,076 B1 * | 10/2001 | McVicker | ....................... | 359/601 |
| 6,408,461 B2 * | 6/2002 | Zheng | ................................ | 5/417 |
| 6,425,494 B1 * | 7/2002 | Woods, II | ....................... | 220/739 |
| 6,648,396 B2 * | 11/2003 | Monahan et al. | ............. | 296/97.7 |
| 7,007,322 B2 | 3/2006 | Alane | | |
| 7,347,019 B1 * | 3/2008 | Shaw | ............................ | 40/607.01 |
| 7,485,071 B2 | 2/2009 | Edwards | | |
| 7,591,033 B2 * | 9/2009 | Theriault | .......................... | 5/417 |
| 7,666,269 B2 | 2/2010 | Shaw | | |
| 8,096,923 B2 | 1/2012 | White | | |
| 2003/0155389 A1 | 8/2003 | Swartzentruber | | |
| 2005/0192158 A1 | 9/2005 | Edwards | | |
| 2010/0031447 A1 | 2/2010 | Huang | | |
| 2011/0131723 A1 | 6/2011 | Andrews | | |

* cited by examiner

*Primary Examiner* — Michael Trettel
(74) *Attorney, Agent, or Firm* — Milord A. Keshishian (57) ABSTRACT

The present invention discloses a device that is comprised of a flexible material and a roll mechanism associated with the flexible material. A bistable resilient member maintains the flexible material flat due to a tension force within the body of the bistable resilient member in a first stable state, and maintains the flexible material to a rolled-up, bundled closed position after the tension force within the body of the bistable resilient member is fully released (the second stable state). Further, the bistable resilient member compels the flexible material to a self-roll-up motion (during a transition state) while a tension force within the body of the bistable resilient member is released.

9 Claims, 9 Drawing Sheets

DEVICE WITH ROLL MECHANISM

BACKGROUND OF THE INVENTION

1. Field of the Invention

The present invention is related to a flexible material with roll mechanism and, more particularly, to flexible material that self-rolls.

2. Description of Related Art

Conventional flexible material such as mats are well known and have been in use for a number of years. In general, mats are used as a cushion and may comprise of material with thickness and flexibility that provides a protective, softened padding between a user body and the ground.

Due to their soft, flexible composition and thickness, regrettably, most mats suffer from obvious disadvantages in that they easily bent out of their normal shape during use, loosing their proper stance (whether in rolled-up, or bundled position or rolled-out, open position). For example, when a conventional mat is rolled-out from its closed position, instead of having a proper flat stance, its ends may continue to remain curled (in a rolled-up position) or its body may remain curved (rather than remain flat on the ground). In general, most users place heavy objects on top of the mat or the curled ends of the mat to flatten the mat for proper use.

Another disadvantage with conventional mats is that rolling-up the mat requires a great deal of effort, especially for large size mats that are used in camping. That is, when rolling-up a mat of any size to a closed or bundled position, the user must first align the lateral edges of every roll within the same plane so that the bundled mat is not rolled skewed or slanted (into a telescoping "cone" shape). Simultaneously, the user must also apply constant pressure on the rolling body portion of the mat so that the rolling mat is rolled in a tight or compact bundle for storage without unwinding. This is especially difficult for thicker mats and if not done properly, the rolled mat may laterally "telescope" out. Accordingly, rolling-up a mat into a bundle is very inconvenient if the user is fatigued due to exercise (e.g., if the mat is a yoga mat) or camping (e.g., if the mat is used as a cushion under a sleeping bag).

Assuming that the mat is rolled-up properly, the users must then take the next, time consuming, inconvenient, but necessary step of applying a strap around the rolled-up mat to keep the mat bundled up, otherwise, the mat would tend to unroll due to its flexible composition. This is especially true for larger size mats used for camping. It should be noted that some mats are not sold with a strap and hence, users must either purchase a strap or simply roll-up the mat tightly and store fit it in a tight space, hoping that the mat does not unroll. Upon properly bundling the mat (with or without a strap), if the mat is stored up-right on its rolled edges, resting at a slight angle against some vertical support, the exposed corner ends of the mat that carry its weight will bend and remain bent while stored, with the mat loosing its proper stance.

Accordingly, in light of the current state of the art and the drawbacks to current mats mentioned above, a need exists for a flexible material that would easily roll into a properly tight, rolled-up bundle and maintain its properly rolled posture without much effort or the requirement of a strap, and that would easily unroll into a fully flat open position without much effort or without loss in proper stance. Further, a need exists for a flexible material that would protect its corner ends from bending.

BRIEF SUMMARY OF THE INVENTION

A non-limiting, exemplary optional aspect of the present invention provides a device, comprising a flexible material and a roll mechanism associated with the flexible material.

Another non-limiting, exemplary optional aspect of the present invention provides a device, comprising a mat, a pair of bistable resilient members coupled with the mat, with the bistable resilient members substantially equally distanced from a center axis of the mat, positioned near lateral edges of the mat. Further provided are a pair of rigid elements coupled with distal ends of the pair of bistable resilient members.

A further, non-limiting, exemplary optional aspect of the present invention provides a method for rolling-out and rolling-up a flexible material, comprising coupling at least one bistable resilient member with the flexible material to allow the flexible material to roll-up and bundled into a closed position when the bistable resilient member is caused to change from a first stable state to a second stable state.

Such stated advantages of the invention are only examples and should not be construed as limiting the present invention. These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character(s) present corresponding part(s) throughout.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

Throughout the disclosure, specific references to a mat, pad, or cushion are only meant for convenience of examples of a flexible material and should not be limiting. In fact, any flexible material that is rolled to one of an open or closed positions for use and storage may be used, non-limiting examples of which may include exercise mats such as yoga mats, camping mats, children's nap mats, floor mats, or most other types of items such as cloth, carpets, cushions or pads that are rolled-out to a flat, open position for use and rolled-up and bundled to a closed position for storage.

The present invention provides a device comprised of a flexible material that easily rolls into a properly tight, rolled-up bundle and maintain its properly rolled posture without much effort or the requirement of a strap, and that also easily unrolls into a fully flat, rolled-out open position without much effort or without loss in proper stance. The device of the present invention further provides protection for the corner ends of the flexible material from bending during storage.

In particular, the present invention provides a device that is comprised of a flexible material (e.g., a mat, carpet, cloth, pad, cushion, etc.) and a roll mechanism associated with the flexible material, with a longitudinal axial length of the roll mechanism oriented at an angle in relation to a desired rolling direction of the flexible material that facilitates the roll of the flexible material.

In general, the roll mechanism of the present invention may include at least one bistable resilient member (e.g., a bistable spring band or strip) that has a first stable state, a second stable state, and a transition state. The first stable state of the bistable resilient member is a straightened out state, creating tension within the body of the member, with the second stable state of the bistable resilient member being a curved, rolled-up state. The bistable resilient member transitions from one of the first and second stable states to another of the second and first stable states by application of a force that initiates the transition state of the bistable resilient member from one of the first and second stable states to another of the second and first stable states.

The bistable resilient member associated with the flexible material maintains the flexible material to a flat, straightened, and open position when the bistable resilient member is in the first stable state, and maintains the flexible material to a rolled-up, bundled closed position when the bistable resilient member is in the second stable state. The flexible material is compelled to roll out to a flat, straightened open position or self-roll-up to a bundled closed position when the associated bistable resilient member is in the transition state. Stated otherwise, the bistable resilient member maintains the flexible material flat due to the created tension within the body of the bistable resilient member in the first stable state, and maintains the flexible material to a rolled-up, bundled closed position after the tension force within the body of the bistable resilient member is fully released (the second stable state). Further, the bistable resilient member compels the flexible material to a self-roll-up motion (to bundle) during the transition state while the tension force within the body of the bistable resilient member is being released. The transition state for the roll out of the flexible material into a flat, open position requires an application or exertion of an external force to roll out the flexible material, which creates or generates the tension force within the bistable resilient member when it is snapped from the transition state to the first stable state.

FIGS. 1A and 1B are non-limiting, exemplary illustrations of a flexible material in a form of a non-limiting, exemplary mat that includes a roll mechanism in accordance with the present invention. The illustrated flexible material 100 of FIGS. 1A and 1B accommodates within its body a roll mechanism that allow the flexible material 100 to self-roll into a properly tight, rolled-up bundle and maintain its properly rolled posture without much effort or the requirement of a strap, and that also easily unrolls into a fully flat, rolled-out open position without much effort or without loss in proper stance. The roll mechanism accommodated within the body of the flexible material 100 of the present invention in FIGS. 1A and 1B further provide protection for the corner ends 306 thereof from bending during storage.

The flexible material 100 of the present invention includes a first side 102, a second side 118 (FIG. 2), a length 104, a width 106, and a thickness for use. As illustrated in FIGS. 1A and 1B, the roll mechanism (shown in dashed lines in FIG. 1B) is preferably accommodated within the body of the flexible material 100, where it is inconspicuous and generally cannot be felt by users (depending on the thickness of the flexible material 100). The roll mechanism (detailed below) is preferably comprised of a pair of bistable resilient members 108 and a pair of rigid elements 110 (all shown in dashed lines in FIG. 1B) that are preferably inserted within the body of the flexible material 100 that has sufficient thickness that can accommodate the roll mechanism. Any number of bistable resilient members 108 and or rigid elements 110 may be associated with the flexible material 100 and should not be limited to the pairs illustrated.

It should be noted that the remaining FIGS. 2 to 4B (detailed below) illustrate another embodiment of the present invention where the roll mechanism is associated with the flexible material 100 on either or both outer sides (102 and or 118) rather than within the body of the flexible material 100, which also facilitate in teaching and better understanding of the invention. Accordingly, FIG. 2 is a non-limiting, exemplary illustration of a flexible material in a form of an exemplary mat that includes a roll mechanism as shown in FIGS. 1A and 1B, but with the roll mechanism associated with an outer side thereof in accordance with another embodiment of the present invention.

Figure 1:
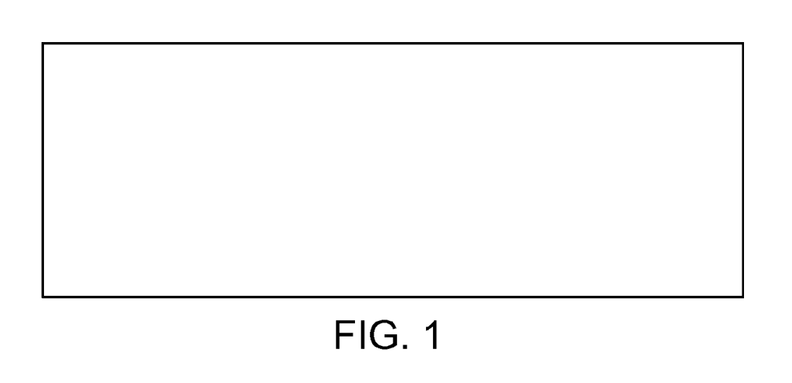
FIGS. 1A and 1B are non-limiting, exemplary illustrations of a flexible material in a form of a non-limiting, exemplary mat that includes a roll mechanism in accordance with the present invention.
Figure 2:
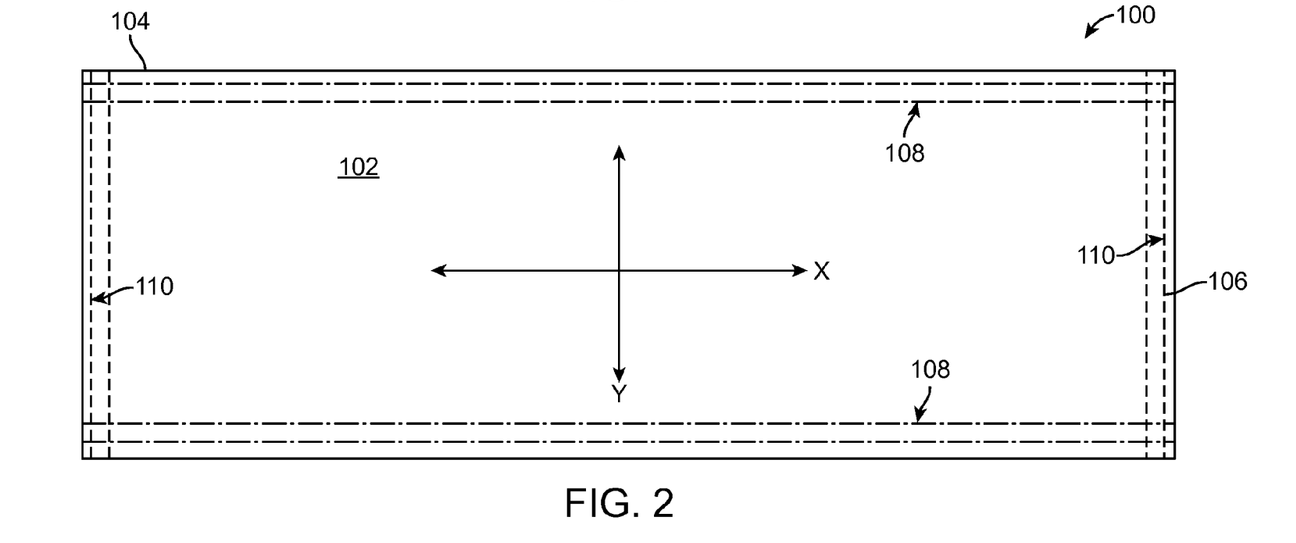
FIG. 2 is a non-limiting, exemplary illustration of a flexible material in a form of an exemplary mat that includes a roll mechanism as shown in FIGS. 1A and 1B, but with the roll mechanism associated with an outer side thereof in accordance with another embodiment of the present invention.
Figure 3:
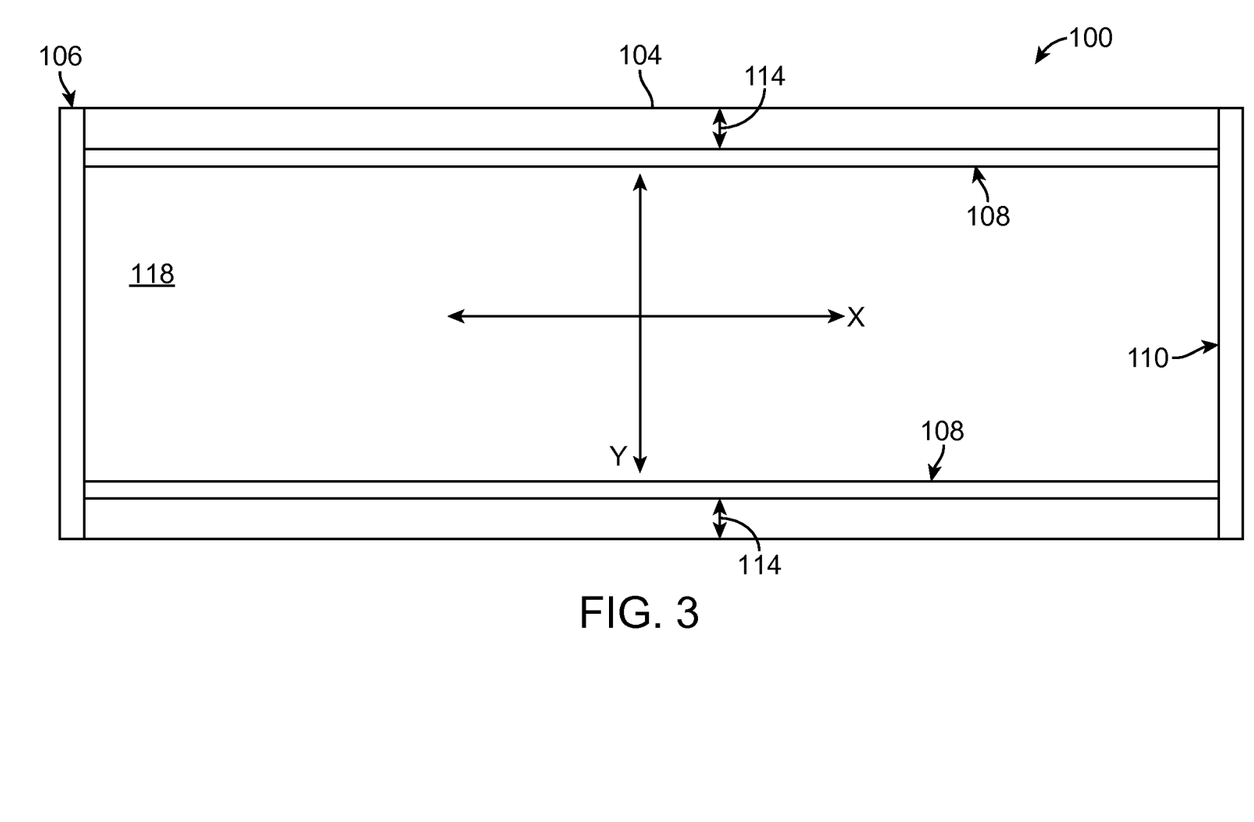
FIGS. 3A to 3F are non-limiting, exemplary illustrations of the device of FIGS. 1A to 2, progressively illustrating the gradual self-rolling of the flexible material from the rolled-out or flat and open position (FIGS. 1A to 3A) to rolled-up, bundled closed position (FIGS. 3E and 3F) in accordance with the present invention.
Figure 4:
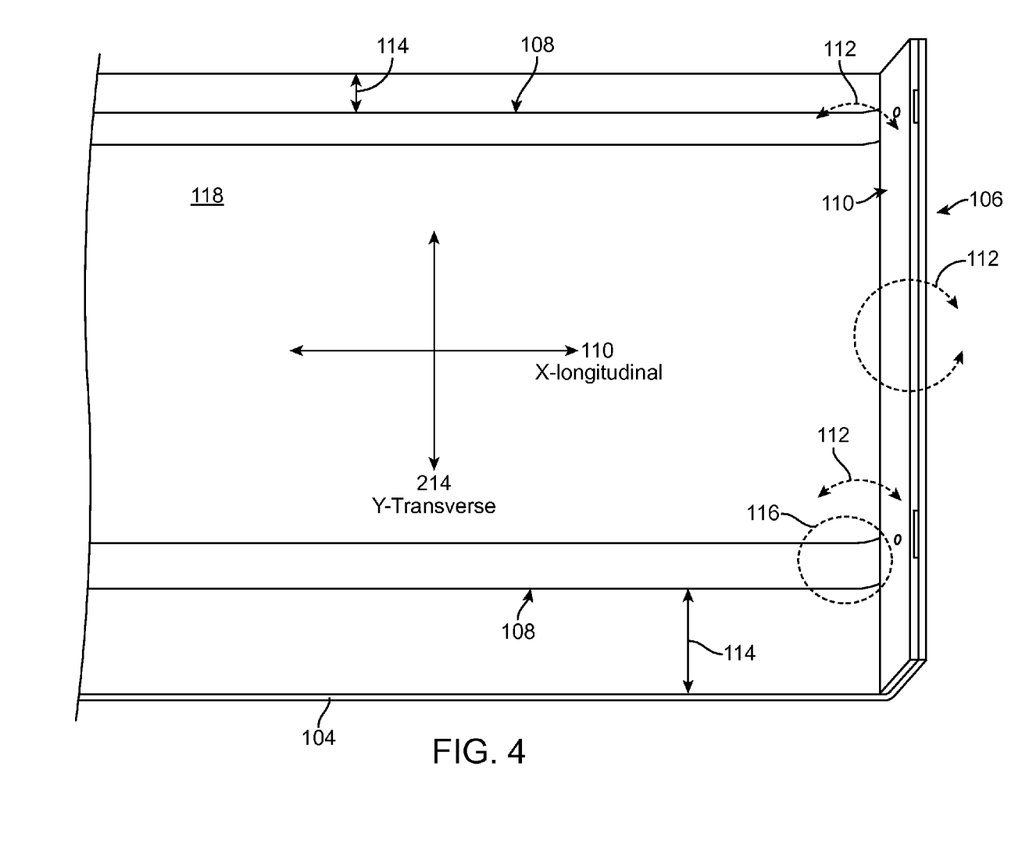
FIGS. 4A and 4B are non-limiting, exemplary illustrations of the device of FIGS. 1A to 3F, illustrating a rigid element and its relation to the flexible material in accordance with the present invention.
Figure 5:
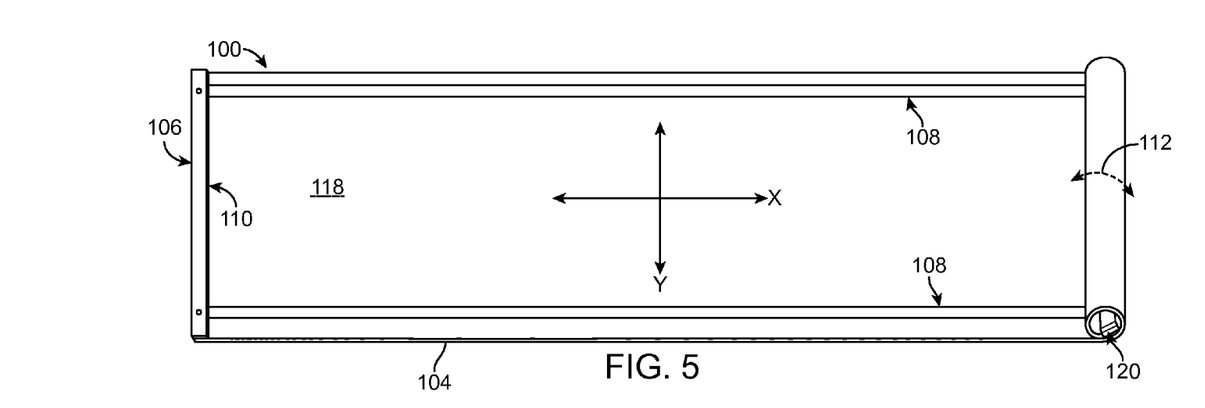
Figure 6:
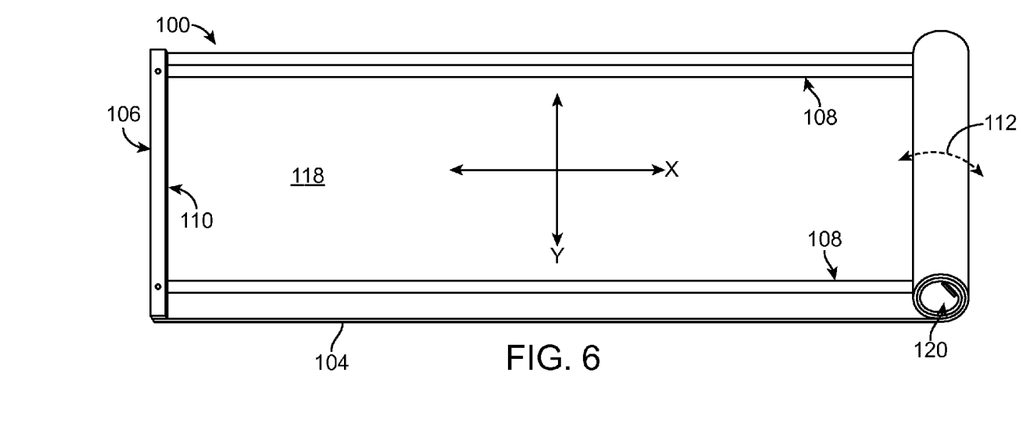
Figure 7:
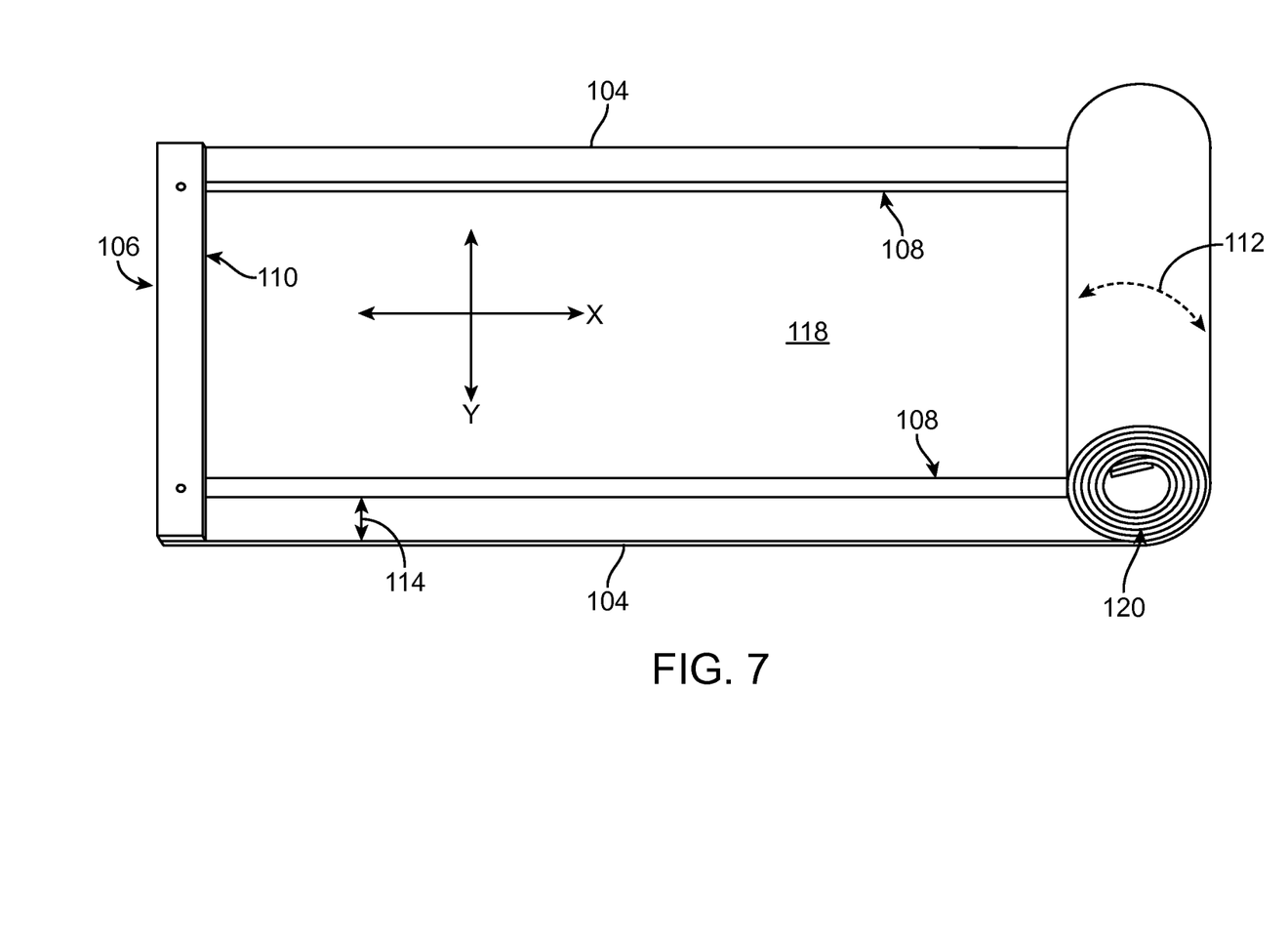
Figure 8:
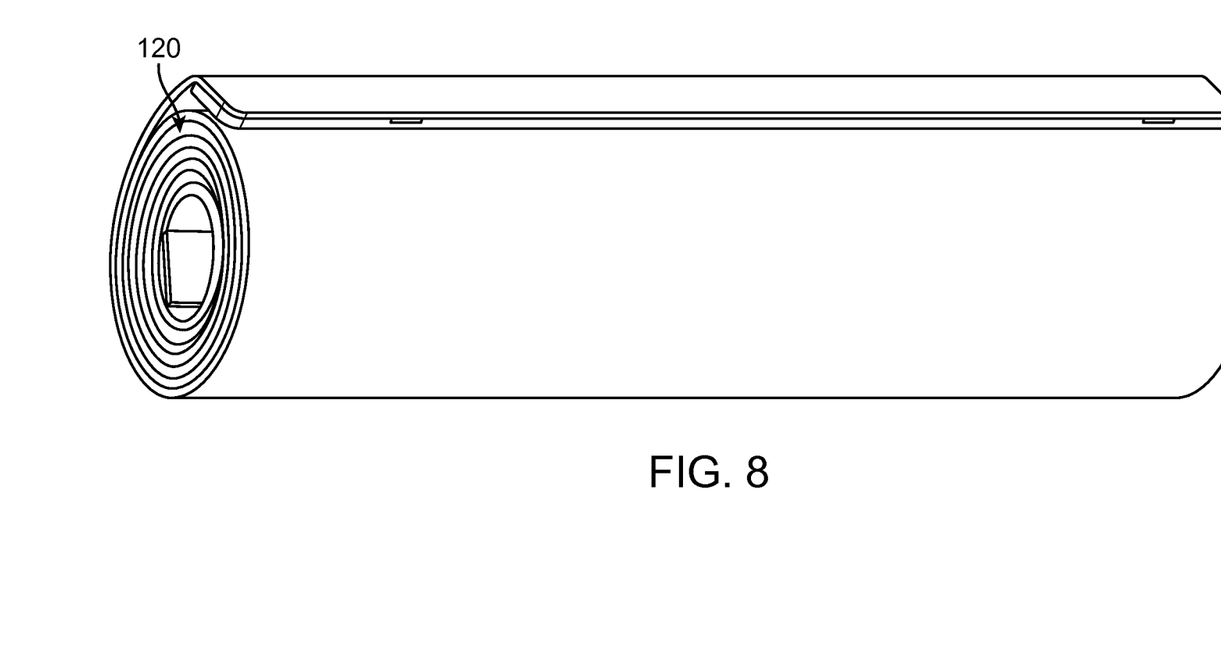
Figure 9:
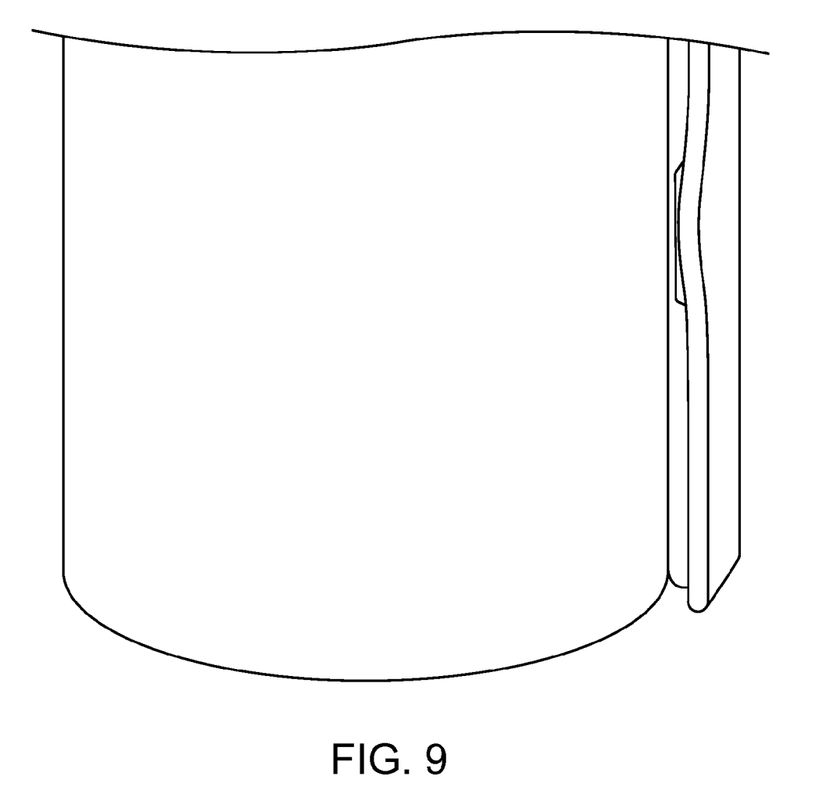

As illustrated in FIGS. 1A to 2, the flexible material 100 of the present invention includes, without limitations, an exemplary pair of bistable resilient members 108 coupled with an outer side 118 thereof. It should be noted that any number of bistable resilient members 108 may be associated with any one or both sides (102 and or 118) of the flexible material 100. However, if one or more bistable resilient members 108 are used on both sides (102 and 118) of the flexible material 100, then their manner of association with their respectively associated side must be coordinated for the proper roll of the flexible material 100. For example, if a first bistable resilient member 108 is used on a first side 102 of the flexible material 100, and a second bistable resilient member 108 is used on the second side 118 of the flexible material 100, both bistable resilient members 108 must be oriented with their respective associated first and second sides 102 and 118 so that their respective states (first stable state, second stable state, and transition state) are harmonized for proper roll of the flexible material 100. In fact, if more than one bistable resilient member 108 is used (regardless of location in relation to the flexible material 100), then all bistable resilient members 108 must be oriented so that their respective states (first stable state, second stable state, and transition state) are harmonized.

Further included with the device of the present invention is a pair of rigid elements 110 that are also coupled with the outer side 118 of the flexible material 100 and further coupled with the bistable resilient members 108. As with the bistable resilient members 108, any number of rigid elements 110 may be associated with any one or both sides (102 and or 118) of the flexible material 100. Further, the shape of the rigid elements 110 need not be straight and may include any configuration. For example, the shapes of the rigid elements 110 may be commensurate with the shape or contour of the side with which they are associated.

In general, a bistable resilient member 108 is associated with the flexible material 100 along a desired rolling direction of the flexible material 100. More specifically, it is generally preferred if a longitudinal axial length of the bistable band 108 is oriented along a desired rolling direction of the flexible material 100. The orientation of the association of the roll mechanism in relation to the roll direction of the flexible material 100 is detailed below.

FIGS. 3A to 3F are non-limiting, exemplary illustrations of the device of FIGS. 1A to 2, progressively illustrating the gradual self-rolling of the flexible material from the rolled-out or flat and open position (FIGS. 1A to 3A) to rolled-up, bundled closed position (FIGS. 3E and 3F) in accordance with the present invention. In the exemplary instance shown in FIGS. 1A to 3F, the desired rolling direction of the flexible material 100 is selected to be along its central longitudinal axis (along the illustrated X-ordinate), which parallels its length 104. In the exemplary instance of the exemplarily selected desired rolling direction, the axis of rotation (or the roll axis) of the flexible material 100 will be along its transverse axis (the illustrated Y-ordinate), which parallels its width 106. The roll may be initiated from either end 106 of the flexible material 100. As illustrated in FIGS. 3A to 3F, to initiate the transition state of the bistable resilient members 108 and hence, commence the self-rolling motion of the flexible material 100 without any further action, a user "snaps" an end of the bistable resilient members 108 (shown within the dashed circles 116) by manipulating the rigid element 110 in the direction indicated by the dashed arrows 112, and simply allows the entire flexible material 100 to self-roll into a cylindrical bundle progressively illustrated in FIGS. 3A to 3F. It should be noted when unrolling (or rolling out) the flexible material 100 into a flat, open position, the rigid elements 110 are manipulated in the direction indicated by the dashed arrows 113 (FIG. 3A) to "snap" the bistable resilient members 108 from the transitional state to the first stable state.

As stated above, the bistable resilient member 108 is generally associated with the flexible material 100 along a desired rolling direction of the flexible material 100, which may be selected according to application and use. For example, in the exemplary, non-limiting instance illustrated in FIGS. 1A to 4B, the rolling direction of the flexible material 100 is selected to be along a longitudinal axial length of the flexible material 100 (the length 104), which is along the illustrated X-ordinate of the illustrated X-Y plane, resulting in a roll-axis of the flexible material 100 that is parallel the width 106 (or the Y-ordinate) and transverse the longitudinal axial length of the flexible material 100. Accordingly, for the given exemplary selected rolling direction chosen for fleixbel material 100 illustrated FIGS. 1A to 4B, a longitudinal axial length of the bistable band 108 is preferably oriented substantially parallel the lateral edges (or length 104) of the flexible material 100 (along the illustrated X-ordinate), and substantially perpendicular to a desired roll axis (which is the transverse or Y-axis—the width 106) of the rolling flexible material 100 shown in FIGS. 1A to 4B. In other words, the illustrated setup (in FIGS. 1A to 4B) will roll the flexible material 100 along its length 104. If users wish to roll the flexible material 100 along its width 106 instead (e.g., due to some application requirement), then the longitudinal axial length of the bistable band 108 should be oriented along the width 106 (the roll direction) and at an angle in relation to the roll axis, the length 104 or the X-ordinate.

It should be noted that any one or more bistable resilient members 108 may be associated with the flexible material 100 along a desired rolling direction of the flexible material 100, with the longitudinal axial lengths of the bands 108 oriented at any desired angle in relation to the desired rolling direction or the roll-axis of the flexible material 100. In other words, the longitudinal axial lengths of the bistable resilient members 108 need not be oriented perpendicular to the roll-axis or parallel the roll direction of the flexible material for the flexible material to self-roll. However, the longitudinal axial lengths of the bistable resilient members 108 are preferably oriented perpendicular to the roll-axis (parallel the roll direction) for a proper roll where the flexible material 100 is rolled up into a substantially right-circular cylindrical configuration illustrated in FIGS. 3E and 3F with the illustrated cylindrical body and a flattened base 120 and no telescoping of its body from the base 120.

As illustrated in FIGS. 1A to 3F, a pair of bistable resilient members 108 are preferably used and placed equally distanced 114 from the lateral edges 104 of the flexible material 100 because the tension forces of the respective bistable resilient members 108 are then substantially equally released during the transition state, providing a balanced (or stable) roll and compelling a proper roll of the flexible material 100. That is, the pair of bistable resilient members 108 continuous and substantially equally release their respective tension force during the transition state along their respective positions (equally distanced 114 from the lateral edges 104) associated with the flexible material 100, balancing one another, enabling a proper roll with rolling lateral edges 104 continuously maintained within the same plane (passing through the base 120) during all of the transitional state. During the rolling motion, the continuous release of the tension forces of both members 108 counter balance and create an equilibrium where during the roll-up motion, each exert a force that aligns the lateral edges 104 within their respective plane passing through the respecitive base 120. This enables a straight rolling direction. With the use of only a single bistable resilient member 108, the potential does exist that the roll may be skewed or slanted. This is especially compounded when one side of the flexible material 100 may have a slightly different rigidity or crookedness verses a second lateral side and the force of the tension released from a single bistable resilient member 108 positioned along the center or other orientation may not be able to compensate for the physical variations of the lateral sides of the flexible material 100 and hence, the final rolled up unit may be skewed or not straight. For example, one lateral side may not roll as easily as the other, which may be a softer side and hence, the tension force released from the single bistable resilient member 108 will not have an equal impact on the roll of the lateral sides with differing physical properties. Therefore, the use of bistable resilient members 108 equally distanced at 114 along both lateral edges 104 help in rolling the flexible material 100 straight since the overall release of the tension force and its overall impact will be cumulative, balanced, and effective.

As further illustrated, in addition to a preferred use of two bistable resilient members 108, they are also positioned substantially equally distanced from a center axis of the flexible material 100, positioned a distance 114 away from the lateral edges 104 of the flexible material 100. The placement of the bistable resilient members 108 along the outer edges of the flexible material 100 (a distance 114 away from the very lateral edge 104) is also for the comfort of the user. That is, if for example the flexible material 100 is used as an exercise mat (e.g., a yoga mat), then it is preferred if the middle portion of the flexible material 100 has nothing that would be "felt" by the user during yoga exercises. Additionally, placing the bistable resilient members 108 far apart has the added important benefit of facilitating a proper roll since if they are juxtaposed too close to one another, then their cumulative effect would be lost and would tantamount to a use of a single bistable resilient member 108. On the other hand, if the bistable resilient members 108 are positioned too close to the lateral edge 104 or too far away from each other (with a very small distance 114), then they have a greater chance of being torn off of the flexible material 100. That is, the bistable resilient members 108 have a fairly sharp edge that may cut into the flexible material 100 and hence, they are placed a distance 114 away from the lateral edges 104, making the span defined by distance 114 as a "buffer or safe zone." This is particular important if the flexible material is rolled and set on its lateral edges 104 (the base 120 shown in FIGS. 3E and 3F), where if the bistable resilient members 108 are too close to the lateral edges 104, the bistable resilient member edges may cut into the lateral edges 104 of the flexible material 100 or easily peel away from the flexible material 100. Therefore, distance 114 provides a cushion or a buffer so that the bistable resilient members 108 are within the "safe zone."

FIGS. 4A and 4B are non-limiting, exemplary illustrations of the device of FIGS. 1A to 3F, illustrating a rigid element and its relation to the flexible material in accordance with the present invention. As illustrated, a pair of rigid elements 110 is coupled with distal ends of the pair of bistable resilient members 108. As best illustrated in FIGS. 4A and 4B, an exemplary rivet 404 may be used to connect the distal ends of the bistable resilient member 108 extending out of a cut-out area 406 of the rigid element 110. However, such a connection is optional and need not be used to connect the rigid elements 110 with the bistable resilient members 108. The distal ends of the bistable resilient members 108 may be inserted and secured into a cavity of the rigid element 110 instead. In such an instance, the thickness 408 of the rigid element 110 must be of sufficient dimension to allow for a cavity. Nonetheless, any type of mechanism may be used to couple the bistable resilient members 108 with the rigid elements. In fact, even a strong adhesive may be used to glue the bistable resilient members 108 with the rigid elements 110.

The rigid elements 110 secure the distal ends of the bistable resilient members 108 to the flexible material 100. If the bistable resilient members 108 are attached by an adhesive such as a glue to the flexible material 100, one of the functions of the rigid elements 110 is to secure and maintain the distal ends of the bistable resilient members 108 in contact with the flexible material 100. This way, the bistable resilient members 108 cannot be literally ripped off and away from the flexible material 100 during their transition state due to the release of their tension force. As importantly, the rigid elements 110 facilitate the initiation of the transition state of the bistable spring bnads 108. That is, the rigid elements 110 may be thought of as a "handle" that facilitates the initiation or end of the transition state of the bistable resilient members 108 by aiding the user to "snap" the bands 108 from a stable state (first or second) to a transition state and vice versa (from the transition state to one of the first and second stable states) as described above.

It should be noted that dimensions of the rigid pair of elements 110 may be varied, but would affect the way the flexible material 100 rolls to one of open and closed positions. For example, increasing the width dimension 402 or the thickness 408 of the rigid pair 110 would increase the overall radius of the finally rolled and bundled flexible material 100. The opposite would be true if the width or thickness sizes 402 and 408 are reduced, which would result in a reduced radius of the finally rolled and bundled flexible material.

It should further be noted that although a single, elongated continuous piece of rigid element is illustrated per distal ends of the bistable resilient members 108, each distal end of the bistable resilient member 108 may be coupled with a separate, shorter piece of rigid element 110. That is, a total of four rigid elements may be coupled with the exemplary four distal ends of the exemplary two, bistable resilient members 108. However, a single, elongated continuous piece of rigid element 110 per distal ends of the bistable resilient members 108 as illustrated is preferred. The single elongated rigid element 110 facilitates in ending or initiating the transition state of all bistable spring strips (regardless of their number) with one hand of the user, substantially simultaneously distributing a force of the exerted pressure by one hand, longitudinally, along its axial length and transferring the force to the bistable resilient members to snap them to end or initiate the transition state. With shorter, individual rigid elements 110, both hands of the user must be used to end or initiate the transition state of each bistable resilient member 108.

The pair of rigid elements 110 in combination with the pair of bistable resilient members 108 as illustrated in all the figures form a sturdy "frame" for the flexible material 100 that facilitate in the proper roll. That is, the combination provides a framed skeleton that enables a properly tight, rolled-up bundle flexible material 100 that also maintain its properly rolled posture without much effort or the requirement of a strap. Further, the frame also enables flexible material to easily unroll into a fully flat open position without much effort or without loss in proper stance. The pair of rigid elements also aid in protecting the corner ends 306 of the flexible material 100 from bending.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of,"

"operation of," or "operational act of" in the claims herein is not intended to invoke the provisions of 35 U.S.C. 112, Paragraph 6.

What is claimed is:

1. A device, comprising:
a flexible material; and
a roll mechanism accommodated within a body of the flexible material;
the roll mechanism is comprised of:
a first bistable resilient member having a first longitudinal axial length that is oriented substantially parallel along a desired rolling direction of the flexible material, substantially perpendicular to a desired roll axis of the flexible material, and substantially parallel a first lateral edge of the flexible material;
a second bistable resilient member having a second longitudinal axial length that is oriented substantially parallel along the desired rolling direction of the flexible material, substantially perpendicular to the desired roll axis of the flexible material, and substantially parallel a second lateral edge of the flexible material;
the first bistable resilient member and the second bistable resilient member accommodated within the flexible material are positioned substantially equally distanced away from the respective first and second lateral edges of the flexible material to allow the roll axis to be maintained substantially perpendicular to a central longitudinal axis of the flexible material during roll of the flexible material for a linear roll of the flexible material into and out of a substantially right-circular cylindrical configuration;
the roll mechanism is further comprised of:
a first rigid element accommodated within the body of the flexible material and associated with a first distal ends of the first and the second bistable resilient member;
the first rigid element having a first longitudinal axial length that is oriented substantially perpendicular the desired rolling direction of the flexible material, substantially parallel to the desired roll axis of the flexible material, and substantially perpendicular the first and the second lateral edges of the flexible material;
a second rigid element accommodated within the body of the flexible material and associated with a second distal ends of the first and the second bistable resilient member;
the second rigid element having a second longitudinal axial length that is oriented substantially perpendicular the desired rolling direction of the flexible material, substantially parallel to the desired roll axis of the flexible material, and substantially perpendicular the first and the second lateral edges of the flexible material;
the first and the second longitudinal axial lengths of the first and the second rigid elements have spans that extend at least from the first resilient member to the second bistable resilient member to facilitate simultaneous application of force to both the first and the second bistable resilient members to initiate one of a transition state and stable states of both of the first and second resilient members together.

2. The device as set forth in claim 1, wherein:
the first and the second bistable resilient members have a first stable state, a second stable state, and the transition state;
the first stable state of a bistable resilient member of the first and the second bistable resilient member is a straightened out state, creating tension within a band of the bistable resilient member; and
the second stable state of the bistable resilient member is a curved, rolled-up state;
the bistable resilient member transitions from one of the first and second stable states to another of the second and first stable states by application of a force that initiates the transition state of the bistable resilient member from one of the first and second stable states to another of the second and first states.

3. The device as set forth in claim 2, wherein:
the flexible material is maintained in a flat, straightened, and open position by the bistable resilient member when the bistable resilient member is in the first stable state;
the flexible material is maintained in a rolled-up, bundled closed position by the bistable resilient member when the bistable resilient member is in the second stable state; and
the flexible material is compelled to roll-out to a flat, straightened open position or roll-up to a bundled closed position by the bistable resilient member when the bistable resilient member is in the transition state.

4. The device as set forth in claim 1, wherein:
the flexible material is a mat.

5. A device, comprising:
a flexible yoga mat;
a pair of bistable resilient members accommodated within a body of the flexible yoga mat;
the bistable resilient members have longitudinal axial lengths that are oriented substantially parallel along a desired rolling direction of the flexible yoga mat, substantially perpendicular to a desired roll axis of the flexible yoga mat, and substantially parallel lateral edges of the flexible yoga mat;
the bistable resilient members are embedded within the body of the flexible yoga mat substantially equally distanced from a center longitudinal axis of the flexible yoga mat, positioned equally distanced away from near lateral edges of the flexible yoga mat to allow the roll axis of the flexible yoga mat to be maintained substantially perpendicular to the central longitudinal axis of the flexible yoga mat during rolling and unrolling of the flexible yoga mat for a linear roll of the flexible yoga mat into and out of a substantially right-circular cylindrical configuration; and
a pair of rigid elements accommodated within a body of the flexible yoga mat and associated with distal ends of the pair of bistable resilient members;
the pair of rigid elements, embedded within the flexibly yoga mat, having longitudinal axial lengths that is oriented substantially perpendicular the desired rolling direction of the flexible yoga mat, substantially parallel to the desired roll axis of the flexible yoga mat, and substantially perpendicular the lateral edges of the flexible yoga mat;
the longitudinal axial lengths of the pair of rigid elements have spans that extend at least between the pair of bistable resilient members to facilitate simultaneous application of force to both pair of bistable resilient members to initiate one of a transition state and stable states of both of the pair of resilient members together.

6. A device as set forth in claim 5, wherein:
the pair of bistable resilient members are covered by a coating.

7. Yoga mat, comprising:
a flexible material forming a cushion;
a pair of bistable resilient members embedded within a body of the flexible material;

the pair of bistable resilient members having a first stable linear state, a second stable coiled state, and a transition state;

the flexible material is maintained in a flat, straightened, and open position by the pair of bistable resilient members when the bistable resilient member are in the first stable linear state;

the flexible material is maintained in a rolled-up, bundled closed position by the pair of bistable resilient members when the pair of bistable resilient members are in the second stable coiled state; and the flexible material is compelled to roll-out to a flat, straightened open position or roll-up to a bundled closed position by the pair of bistable resilient members when the pair of bistable resilient members are in the transition state;

the bistable resilient members have longitudinal axial lengths that are oriented substantially parallel along a desired rolling direction of the flexible material, substantially perpendicular to a desired roll axis of the flexible material, and substantially parallel lateral edges of the flexible material;

the bistable resilient members are embedded within the body of the flexible material substantially equally distanced from a center longitudinal axis of the flexible material, positioned equally distanced away from near lateral edges of the flexible material to allow the roll axis of the flexible material to be maintained substantially perpendicular to the central longitudinal axis of the flexible material during rolling and unrolling of the flexible material for a linear roll of the flexible material into and out of a substantially right-circular cylindrical configuration; and a pair of rigid elements embedded within a body of the flexible material and associated with distal ends of the pair of bistable resilient members;

the pair of rigid elements having longitudinal axial lengths that are oriented substantially perpendicular the desired rolling direction of the flexible material, substantially parallel to the desired roll axis of the flexible material, and substantially perpendicular the lateral edges of the flexible material;

the longitudinal axial lengths of the pair of rigid elements have spans that extend at least between the pair of bistable resilient members to facilitate simultaneous application of force to both pair of bistable resilient members to initiate one of a transition state and stable states of both of the pair of resilient members together.

8. A method for rolling-out and rolling-up a yoga mat, comprising:

embedding a pair of bistable resilient members within a body of the yoga mat substantially equally distanced from a center longitudinal axis of the yoga mat, positioned equally distanced away from near lateral edges of the yoga mat, with a longitudinal axial lengths of the pair of bistable resilient members oriented substantially parallel along a desired rolling direction of the yoga mat, substantially perpendicular to a desired roll axis of the yoga mat, and substantially parallel lateral edges of the yoga mat to allow a roll axis of the yoga mat to be maintained substantially perpendicular to the central longitudinal axis of the yoga mat during a roll of the yoga mat for a linear roll of the yoga mat into and out of a substantially right-circular cylindrical configuration;

embedding a pair of rigid elements within the body of the yoga mat and associating the pair of rigid elements with distal ends of the pair of bistable resilient members;

operation of embedding the pair of rigid elements includes:

orienting longitudinal axial lengths of the pair rigid elements substantially perpendicular the desired rolling direction of the yoga mat, substantially parallel to the desired roll axis of the yoga mat, and substantially perpendicular the lateral edges of the yoga mat;

with the pair of rigid elements having longitudinal axial lengths that span ift at least between the pair of bistable resilient members to facilitate simultaneous application of force to both pair of bistable resilient members to initiate one of a transition state and stable states of both of the pair of resilient members together.

9. Yoga mat, comprising:

a flexible material forming a cushion;

a pair of bistable resilient members associated with the flexible material;

the pair of bistable resilient members having a first stable linear state, a second stable coiled state, and a transition state;

the flexible material is maintained in a flat, straightened, and open position by the pair of bistable resilient members when the bistable resilient member are in the first stable linear state;

the flexible material is maintained in a rolled-up, bundled closed position by the pair of bistable resilient members when the pair of bistable resilient members are in the second stable coiled state; and the flexible material is compelled to roll-out to a flat, straightened open position or roll-up to a bundled closed position by the pair of bistable resilient members when the pair of bistable resilient members are in the transition state;

the bistable resilient members have longitudinal axial lengths that are oriented substantially parallel along a desired rolling direction of the flexible material, substantially perpendicular to a desired roll axis of the flexible material, and substantially parallel lateral edges of the flexible material;

the bistable resilient members are associated with the flexible material substantially equally distanced from a center longitudinal axis of the flexible material, positioned equally distanced away from near lateral edges of the flexible material to allow the roll axis of the flexible material to be maintained substantially perpendicular to the central longitudinal axis of the flexible material during rolling and unrolling of the flexible material for a linear roll of the flexible material into and out of a substantially right-circular cylindrical configuration; and a pair of rigid elements associated with the flexible material and coupled with distal ends of the pair of bistable resilient members;

the pair of rigid elements having longitudinal axial lengths that are oriented substantially perpendicular the desired rolling direction of the flexible material, substantially parallel to the desired roll axis of the flexible material, and substantially perpendicular the lateral edges of the flexible material;

the longitudinal axial lengths of the pair of rigid elements have spans that extend at least between the pair of bistable resilient members to facilitate simultaneous application of force to both pair of bistable resilient members to initiate one of a transition state and stable states of both of the pair of resilient members together.

* * * * *